UNITED STATES PATENT OFFICE.

RENÉ BOHN, OF LUDWIGSHAFEN-ON-THE-RHINE, BAVARIA, ASSIGNOR TO THE BADISCHE ANILIN AND SODA FABRIK, OF MANNHEIM, GERMANY.

ALIZARINE INDIGO-BLUE.

SPECIFICATION forming part of Letters Patent No. 399,482, dated March 12, 1889.

Application filed October 31, 1888. Serial No. 289,678. (Specimens.)

*To all whom it may concern:*

Be it known that I, RENÉ BOHN, a citizen of Switzerland, residing at Ludwigshafen-on-the-Rhine, in the Kingdom of Bavaria and Empire of Germany, have invented new and useful Improvements in the Manufacture of Alizarine Indigo-Blue, of which the following is a specification.

My invention relates to the manufacture of an improved dye-stuff or coloring-matter produced by the action of concentrated sulphuric acid upon alizarine-green at a temperature of about 200° centigrade.

In carrying out my invention I may employ alizarine-green either in its finished mercantile condition or in the state of its solution in sulphuric acid—such as results from the successive treatment of alizarine-blue with sulphuric anhydride and concentrated sulphuric acid in the process of preparing alizarine-green described in my former application for Letters Patent, filed October 18, 1888, Serial No. 288,429.

The following is an example of the manner in which alizarine-green may be converted into alizarine indigo-blue: About ten parts, by weight, of dry and finely-powdered alizarine-green are intimately mixed with or dissolved in about two hundred parts, by weight, of concentrated or rectified sulphuric acid of about 1.848 specific gravity, and the mixture or solution thus prepared is then under constant agitation heated to 210° centigrade, until it has assumed a pure indigo-blue color, which point will generally be arrived at after about five hours heating. The result of the operation is then carefully poured into water, and the precipitate thus formed is collected upon a filter, washed, and pressed, and may afterward be dried or may be used in the state of a paste.

Alizarine indigo-blue prepared as above described is insoluble in water even at the boiling-heat. It forms blue saline compounds upon treatment with caustic or carbonated alkalies. These alkaline salts are quite insoluble in caustic-alkaline solutions. It dissolves with a bright indigo-blue color in concentrated sulphuric acid, and may thus be readily distinguished from alizarine-green, the solution of which in the said solvent is characterized by its red color. It combines with the bisulphites of potash, soda, or ammonia, thus producing compounds soluble in water and capable of being employed in dyeing and printing in a similar manner as analogous bisulphite compounds of alizarine-blue.

Alizarine indigo-blue produces upon chrome-mordanted wool shades which are similar to those produced by indigo-blue.

What I claim as new, and desire to secure by Letters Patent, is—

As a new product, the coloring-matter or dye-stuff (alizarine indigo-blue) hereinbefore described, and having the following characteristics: It is insoluble in water even at the boiling-heat; it forms blue saline compounds upon treatment with caustic or carbonated alkalies, which compounds are quite insoluble in caustic-alkaline solutions; it dissolves with a bright indigo-blue color in concentrated sulphuric acid; it combines with the bisulphites of potash, soda, or ammonia, thus producing compounds soluble in water and capable of being employed in dyeing and printing; upon chrome-mordanted wool it produces shades similar to those produced by indigo-blue.

In testimony whereof I have hereunto set my hand in the presence of two subscribing witnesses.

R. BOHN.

Witnesses:
H. FÜRMANN,
HERM. HANTZ.